United States Patent [19]
Plunkett

[11] 3,890,551
[45] June 17, 1975

[54] REGENERATIVE BRAKING CIRCUIT
[75] Inventor: Allen B. Plunkett, Lawrence Park, Pa.
[73] Assignee: General Electric Company, Erie, Pa.
[22] Filed: Jan. 24, 1974
[21] Appl. No.: 436,340

[52] U.S. Cl. ............................................. 318/376
[51] Int. Cl. .......................................... H02p 3/18
[58] Field of Search .......... 318/138, 139, 209, 211, 318/227, 269, 370, 371, 375, 376, 439

[56]  References Cited
UNITED STATES PATENTS

| | | | |
|---|---|---|---|
| 3,207,974 | 9/1965 | McMurray | 321/45 |
| 3,544,873 | 12/1970 | Gunsser et al. | 318/376 |
| 3,718,847 | 2/1973 | Graf et al. | 318/227 |
| 3,748,560 | 7/1973 | Sawa et al. | 318/376 X |

Primary Examiner—Robert K. Schaefer
Assistant Examiner—W. E. Duncanson, Jr.
Attorney, Agent, or Firm—Dana F. Bigelow

[57]  ABSTRACT

An inverter device which delivers a-c power to an induction motor during motoring and receives power therefrom during regenerative braking has a current commutating capability which varies with the input voltage. During the regenerative braking mode of operation, the input voltage is increased by inserting an impedance in series between the d-c power source and the inverter, thereby increasing the input voltage level beyond that of the d-c power source. The resulting increased current commutation capacity and increased voltage provides for greater power generation without increasing the size of the inverter device. During motoring operation the impedance is removed to provide for the free flow of current to the inverter.

15 Claims, 5 Drawing Figures

REGENERATIVE BRAKING CIRCUIT

BACKGROUND OF THE INVENTION

In propulsion systems where a motor is connected to a voltage source to propel a vehicle, a known method of retarding vehicle movement is that of dynamic retardation, wherein the motor is selectively connected to act as a generator to dissipate the kinetic energy of the vehicle. Banks of resistors are commonly provided in the circuit to receive the generated current and dissipate the energy in the form of heat. This method, called dynamic braking, has certain limitations and is generally used in combination with other supplementary systems such as a mechanical brake.

Also known in the art is the system of regenerative retardation wherein the power generated during the braking function is returned to the power source. This system may be used independently or in combination with dynamic retardation. One approach is to use the regenerative mode as long as the resulting braking effort is sufficient, and then switch to the dynamic mode when the level of braking effort drops below the desired level.

In power conversion devices such as inverters the switching elements are generally commutated by capacitors. Since the current handling capability of these devices is limited by their ability to commutate, the sizing of these devices becomes an important design consideration. In particular, the greatest flow power passes through the system during periods of retardation. Therefore, it is the demands of this mode of operation which determine the size of the system. For example, a given inverter may be large enough to handle any current demand that is made during motoring, but during retardation the increased commutation demands made by higher current flows tend to render the system inadequate, thereby introducing the undesirable requirement for a larger inverter with attendant higher costs.

It is therefore an object of this invention to provide an inverter system which is capable of commutating the power generated by a machine during the braking mode of operation when braking power is greater than the motoring power.

Another object of this invention is the provision for increasing the braking power capability of an inverter system without increasing the size of its components.

A further object of this invention is the provision in an inverter system for increasing the amount of regenerative current that is returned to the power source during the retardation mode of operation.

Another object of this invention is the provision in a propulsion system for commutating more current during periods of retardation than during periods of motoring.

Still another object of this invention is the provision for a regenerative retardation circuit which is economical to build, and useful in operation.

These objects and other features and advantages become more readily apparent upon reference to the following description when taken in conjunction with the appended drawings.

SUMMARY OF THE INVENTION

Briefly, in accordance with one aspect of the invention the current handling capability of an inverter device is increased during periods of braking of associated propulsion motors. This is accomplished by increasing the voltage applied to the commutating capacitors of the inverter to thereby increase their current commutating capability. In this way the amount of power that can be generated is increased without increasing the size of the components within the power conversion device.

One method by which the input voltage can be increased is by selectively inserting an impedance in series between the inverter and the power source. The input voltage is then increased to a level beyond that of the power source, and the capacity for regeneration is increased to effectively raise the rating of the system. During periods of motoring the impedance is removed from the circuit to allow the free flow of current to the inverter device.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
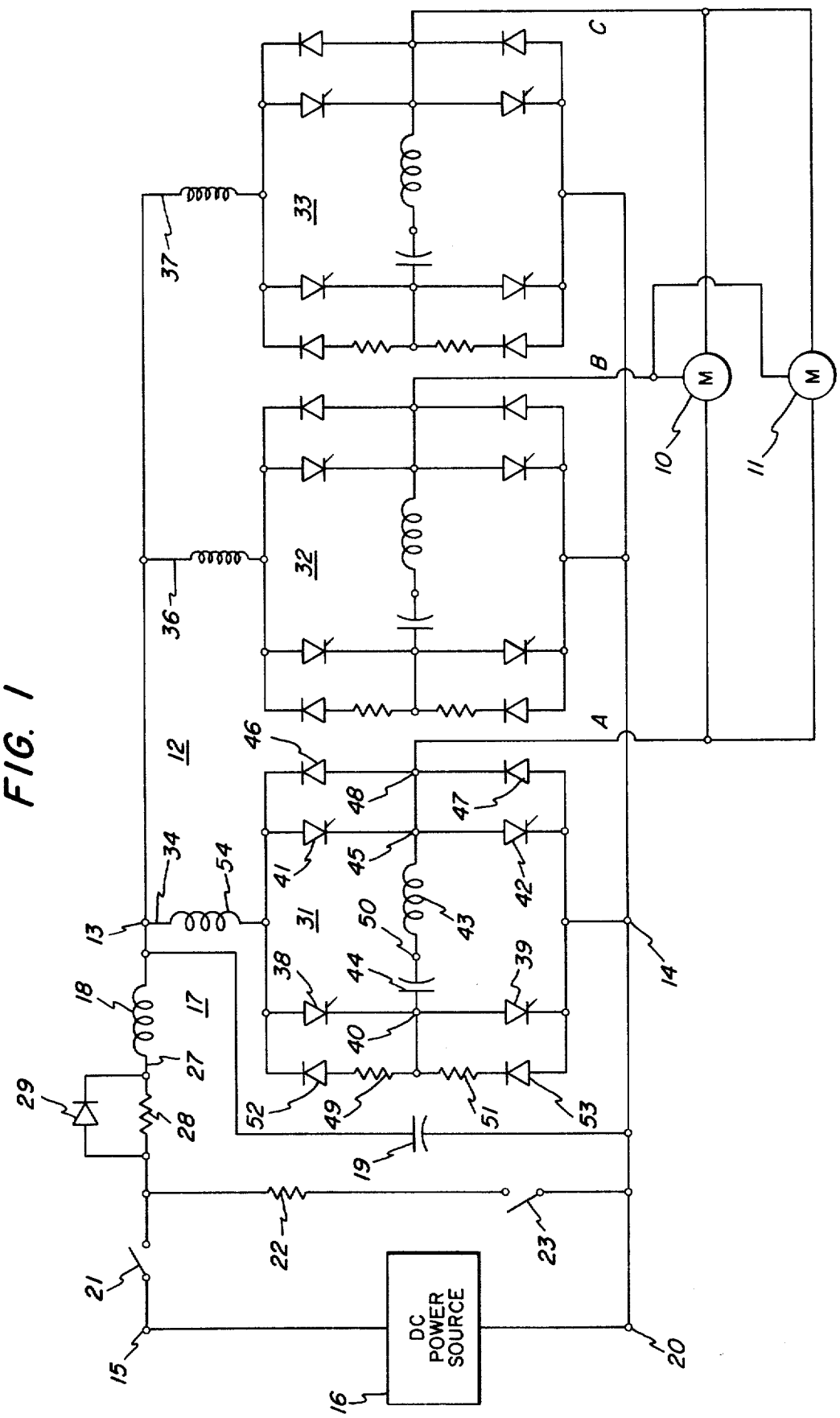
FIG. 1 is a schematic circuit diagram of a preferred embodiment of the invention.

Referring now to FIG. 1, an a-c drive system is shown to include a pair of three phase induction motors 10 and 11 supplied with variable frequency, variable voltage a-c electric power from a power conversion apparatus 12 over phase conductors A, B and C. Power is delivered to the input terminals 13 and 14 of the power conversion apparatus by a d-c power source 16 having positive and negative terminals 15 and 20, respectively. The motors 10 and 11 are designed to operate in a motoring or driving mode during periods in which current is being delivered by the power conversion apparatus 12, and to operate as a generator to return power to the d-c power source 16 during the braking or retarding mode of operation.

Typically in the case of electrically driven vehicles such as transit cars and the like, the d-c power source 16 comprises a 600 volt d-c third rail supply whose voltage can vary from 450 volts to 750 volts with transients up to 1600 volts peak amplitude. The power conversion apparatus 12 preferably comprises inverter circuitry for transforming direct current electric power from the d-c source 16 to polyphase variable frequency, variable voltage a-c electric power for the motors 10 and 11. A low pass filter 17 is preferably provided in the circuit between the d-c supply voltage and the inverter to supply reactive power to the motors, to help suppress the high frequency line current supply generated by the inverter, and to partially isolate the inverter from line transients, the particular filter shown being of the L-C type with an inductor 18 in series and a capacitor 19 in shunt with the circuit. Also connected in series with the circuit is a self-tripping circuit breaker 21 which functions as a line breaker and as protection to the inverter in case of a shoot-through (a failure of one of the thyristors to commutate before the opposite one is turned on). The combination of the circuit breaker with the filter shown will limit the total energy flow into the inverter to a safe level. It should be understood that the filter shown is the most elementary type and that various other designs and modifications may be used to increase the circuit protection characteristics and to modify the system performance as desired.

During the braking modes of operation the motors 10 and 11 act as generators and the current is sent back through the inverter to the line. One method of using up this energy is to pass it through a braking resistor 22 where it is dissipated as heat, a practice commonly known as dynamic braking. This is accomplished by closing the contactor 23 to place the resistor 22 in shunt with the circuit.

Another method of disposing of the power flowing back to the line is that of regenerative retardation wherein the power is returned to the line or d-c power source 16. During this operation the contactor 23 may be left open and the power flows from the input terminal 13, through inductor 18, through the line 27, circuit breaker 21, terminal 15, and to the d-c power source 16. Serially connected in the circuit is a series resistor 28 with a diode 29 connected thereacross. During periods of dynamic retardation this series resistor acts with the braking resistor 22 to dissipate energy in the form of heat. During periods of regenerative retardation the series resistor 28 acts to increase the voltage across the input terminals 13 and 14 to thereby increase the current commutating capability of the power conversion device 12 as will be more clearly described hereinafter. During periods of operation in the motoring mode the supply current passes through the diode 29 to effectively remove the series resistance 28 from the circuit. It should be noted that various other circuit arrangements may be used to accomplish this switching function. For example, the diode 29 may be replaced by a thyristor or transistor and be selectively gated to limit filter charging current during motoring operation as well as switching in the series resistance 28 during the braking operation.

The inverter 12 is preferably a sine-wave-shaped, pulse-width-modulated (PWM) three-phase type of voltage inverter having phase circuits 31, 32 and 33 corresponding to the phase conductors A, B and C, respectively, and receiving d-c power from the terminals 13 and 14 through the leads 34, 36 and 37. A clear understanding of the basic principles of the operation of the inverter 12 may be obtained from U.S. Pat. No. 3,207,974, issued to W. McMurray on Sept. 12, 1965 and assigned to the assignee of the present invention.

The inverter phase circuits 31, 32 and 33 are substantially identical in design, and comprise two sets of two series connected semiconductor type gate controlled rectifiers 38, 39, 41 and 42 connected in series with $di/dt$ inductor 54 across the d-c inlet terminals 13 and 14. The gate controlled rectifiers are essentially PNPN semiconductor devices wherein conduction through the device is initiated by the application of a small gating current to a gating electrode comprising a part of the device. A commutating circuit comprising an inductor 43 and a capacitor 44 connected in series circuit relationship, is connected between the juncture 40 of the two gate controlled rectifiers 38 and 39 and the juncture 45 of the two gate controlled rectifiers 41 and 42. A pair of commutating and load current feedback diodes 46 and 47 are connected across respective ones of the gate controlled rectifiers 41 and 42 in a reverse polarity sense for returning to the dc supply 16 the reactive power associated with inductive loads. When an inverter is supplying an inductive load, the load current must be provided with an alternate path after a controlled rectifier has been suddenly turned off by the commutating impulse. The conducting polarity of the complementary controlled rectifier is not appropriate but a feedback rectifier connected (directly or effectively) in inverse parallel with such complementary controlled rectifier will provide the necessary conducting path. A similar feedback rectifier across the first controlled rectifier function during the other half cycle. Connected across the respective gate controlled rectifiers 38 and 39 are the commutation reset resistors 49 and 51 and diodes 52 and 53. The purpose of these resistors and diodes is to discharge the over-voltage that appears on the commutation capacitor 44 when commutating load current.

In operation the phase circuit 31 will have a gating signal source to supply the gating signals to the gating electrodes of each of the gate controlled rectifiers 38 through 42 respectively. When the gating signal supply source gates on the gate controlled rectifier 41 the potential appearing at point 48 is that at the positive input terminal 13 and represents, in essence, the output load voltage being supplied by that phase of the inverter. During the interval of time that the gate controlled rectifier 41 is on, the potential at the points 48 and 50 will be essentially the potential of the positive input terminal 13, while the point 40 will be maintained at about the negative potential of the power supply. Hence the capacitor 44 will be charged to a potential corresponding to the difference between juncture 40 and point 50. Thereafter, when the gate controlled rectifier 38 is rendered conductive the potential of juncture 40 will jump to the positive input terminal 13 at a rate determined by the $di/dt$ inductor, 54, and the gate controlled rectifier snubber (not shown) and the potential of the point 50 will jump above the positive terminal 13 by the amount of the potential across the capacitor 44. Upon this occurrence, the capacitor 44 will be discharged by a current through the inductor 43 and through the commutating diode 46 and the gate controlled rectifier 38, and will maintain a reverse polarity across the gate controlled rectifier 41 thereby causing this gate controlled rectifier to be turned off. In discharging through the inductor 43, a magnetic field will be built up around the inductor which upon collapsing will cause a reverse polarity charge to be built up across the capacitor 44 so that the point 50 becomes negative with respect to the juncture 40 and drops to some negative value below zero. Thereafter, the load current carrying gate controlled rectifier 42 is rendered conductive and this results in connecting point 48 to the negative input terminal 14, thereby immediately driving the potential of point 48 from the full positive potential of terminal 13 down to the full negative potential at 14. At this time the capacitor 44 will be further charged toward the negative value at terminal 14.

When load current is flowing through the gate controller rectifier 41 prior to commutation, an energy equal to $\frac{1}{2} LI^2$ is stored in the inductor 54. This energy and that energy which remains in inductor 43 (also ½ LI²) at the instant of commutation will transfer to the capacitor 44 as an excess voltage which will cause point 40 to be positive with respect to point 13, thereby impressing a reverse voltage across gate controlled rectifier 38 to turn it off. The excess voltage on capacitor 44 will be discharged to the potential of point 13 by diode 52 and resistor 49 with the result that approximately one half of the excess energy is recovered and one half is dissipated in resistor 49. At the termination of the conduction period of gate controlled rectifier 42 the gate controlled rectifier 39 will be rendered conductive and the reverse procedure of that described above will occur.

It will be recognized that the magnitude of the charge that can be built up on the capacitor 44 is principally dependent on the voltage level existing across the input terminals 13 and 14. As the input terminal voltage is increased, the capability of the capacitor 44 to commutate current is accordingly increased. This increased current handling capability is particularly desirable during periods in which the motors 10 and 11 are operating in the braking or generating mode, since the current generated by the motors must be commutated. The higher the voltage and current that can be applied to the inverter by the motors, the higher the braking level that can be achieved.

Figure 2:
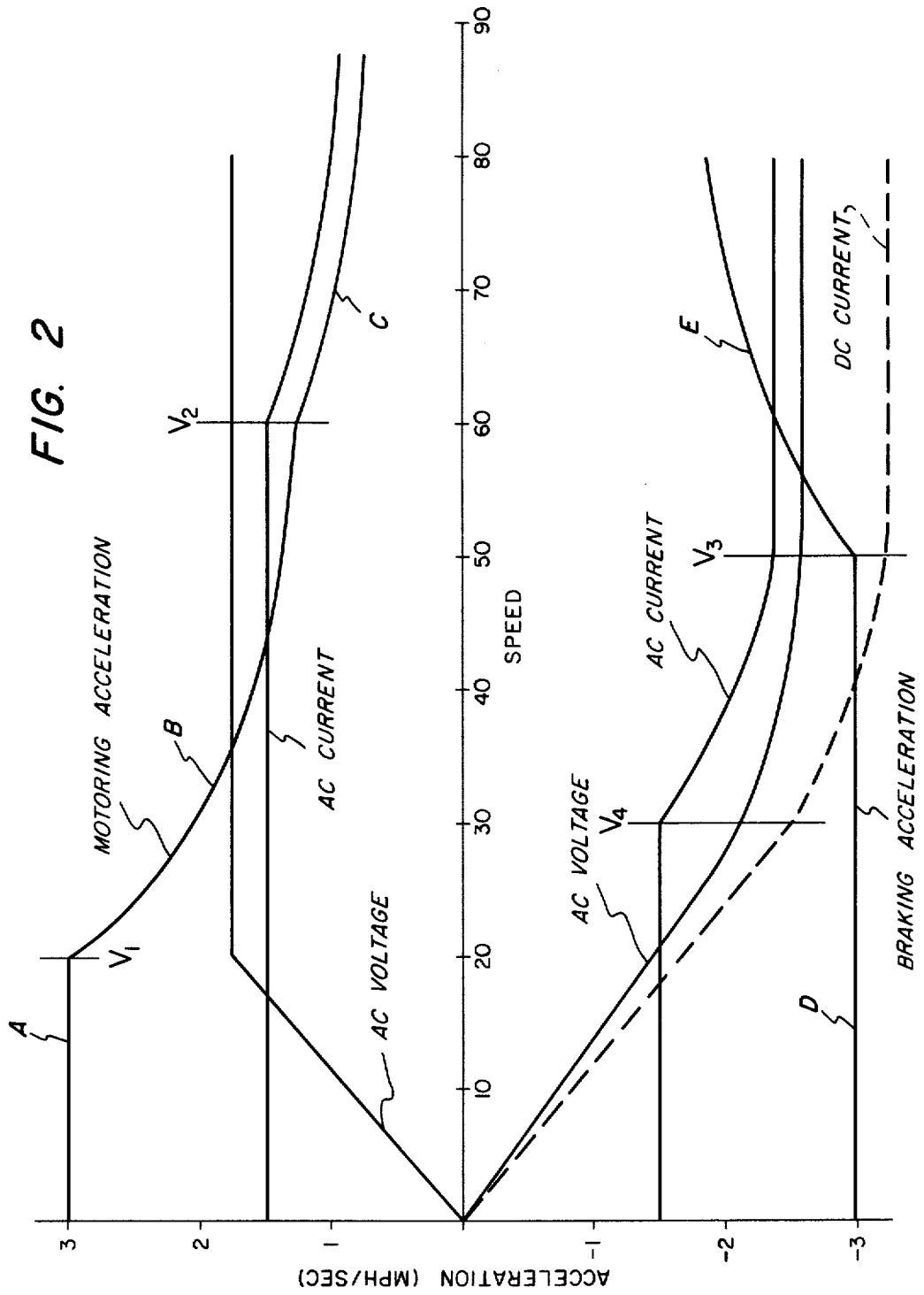
FIG. 2 is a graphic illustration of typical acceleration requirements for various speeds of a vehicle.

Referring to FIG. 2, a graphic illustration is shown of the typical acceleration-versus-speed requirements or performance curve for a transit car, both in motoring and braking. The motoring curve consists of three major sections: (a) a constant tractive effort section to speed $V_1$, (b) a constant horsepower section from $V_1$ to $V_2$, and (c) a series motor section from $V_2$ to the maximum speed. The voltage profile is chosen so as to increase the voltage linearly with speed to the motoring corner point $V_1$ at which the maximum available voltage will be attained. This voltage profile is typically chosen to minimize the inverter current and thus the physical size of the inverter. The shape of the torque speed curve in motoring is partly dictated by motor characteristics and partly by power distribution system limitations. These limitations cause restrictions on the motor design, but it is the electrical braking requirement rather than the motoring requirement which is determinative of the inverter size as will be more clearly shown hereinafter.

The braking curve of FIG. 2 has two sections, the first indicated by the letter D, being a constant deceleration rate in the speed range from 0 to $V_3$ and the second, E, being the constant power taper for speeds above $V_3$. The a-c voltage profile shown for braking increases linearly with speed to the speed $V_4$ at which speed the inverter transitions to square wave operation and the voltage increases as the square root of speed (dynamic brake) to the maximum allowable value. The current also increases as the square root of speed from $V_4$ to $V_3$ which is permissable since the inverter's current commutating capacity increases with voltage.

Figure 3:
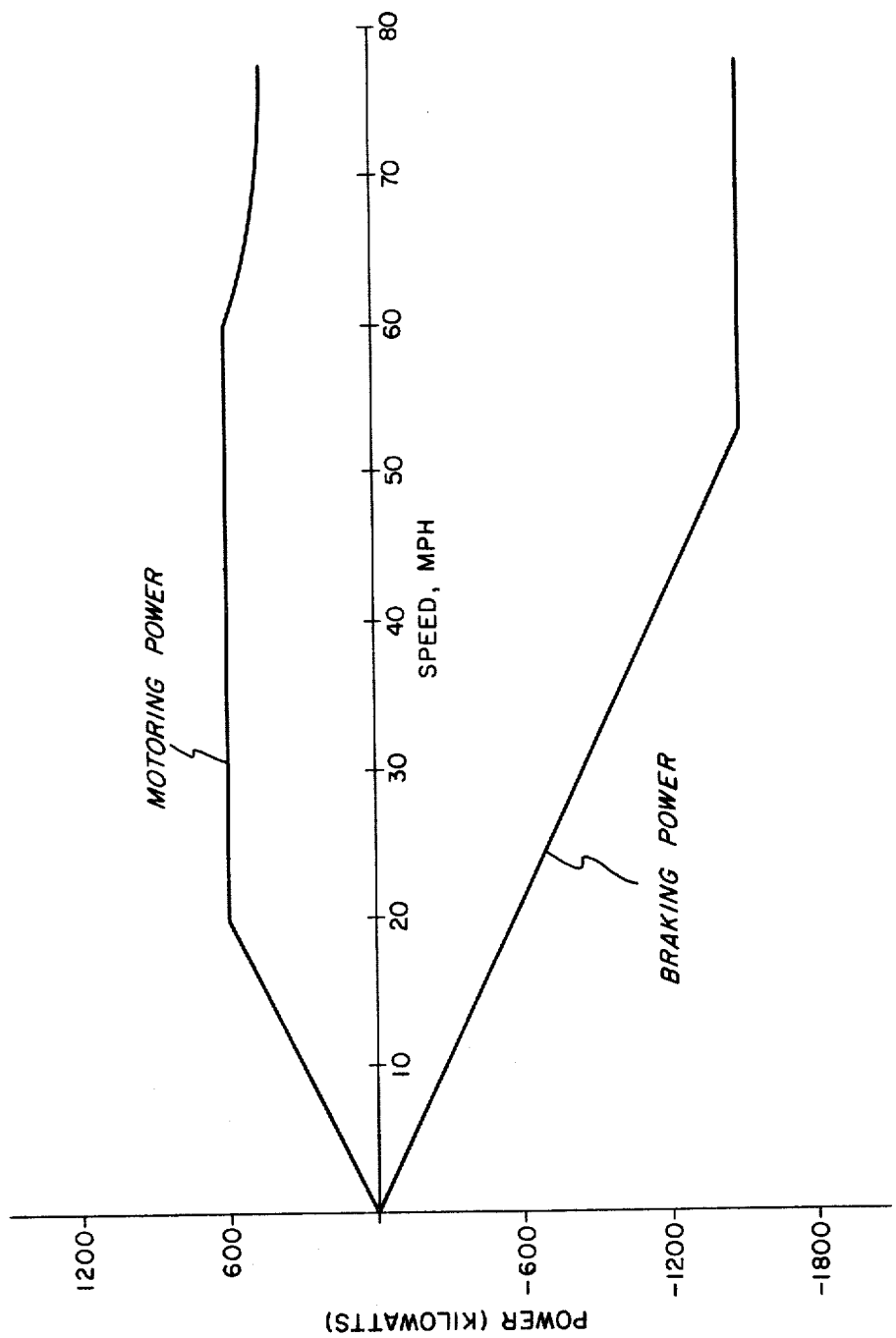
FIG. 3 shows the power requirements for motoring and braking modes of vehicle operation.

FIG. 3 shows the power versus speed requirements which are commensurate with the profiles of FIG. 2. From a comparison of the power levels, it is clearly seen that the braking requirement is the determining factor in sizing the inverter. Since the inverter shown and described is of the impulse commutated type, the allowable a-c current is determined by the d-c input terminal voltage at terminals 13 and 14. This is true because of the characteristics of the so-called "McMurray inverter," to have increased ability to commutate current as its input voltage level is increased.

One method by which the inverter d-c voltage to the input terminals 13 and 14 can be increased without an associated increase in voltage at the d-c power source, is to insert the resistor 28 in series with the line side of the filter as described hereinbefore. This resistor will absorb a portion of the power during dynamic braking when the contactor 23 is closed. More importantly, during periods of regeneration when the circuit breaker 21 is closed it will absorb a portion of the power and will allow the voltage level across terminals 12 and 14 to increase above the maximum permissible level of voltage at the d-c power source. This will in turn increase the current commutating ability of the inverter and allow higher voltages and current at the motor to thereby increase the braking capabilities of the system. In this way a higher power level is obtained in braking than in motoring, thus tending to meet the requirements as shown in FIG. 3.

It should be understood that the circuit breaker 21 may be closed at the same time that the contactor 23 is closed to obtain a blend of regenerative and dynamic braking. Since the regenerative mode allows the vehicle inertia to be partially recovered by supplying d-c current back to the power line, it is more economical and is preferred over the dynamic braking. However, there are certain times that it cannot be used as for example, when the voltage in the line reaches the maximum limit at which time it is no longer receptive to regenerated current. Further, the typical substations used are not receptive to regenerated current and thus other trains must supply all the load for regeneration. Thus there may not be sufficient load to absorb all the regenerated power, and if not, the dynamic braking capability should be provided.

The preferred sizes for the resistances 22 and 28 can be easily derived by equating the power on the d-c side of the inverter to the power that is necessarily developed at the rail. Resistor 28 is sized by allowing the line voltage in regenerative to rise to the maximum allowable (usually about 700 to 750 volts for a nominal 600 volt system). The power at the rail that is necessarily developed is:

$P_R = 1.99 \, W A_3 V_3$ where $W$ = car weight (tons)
$A_3$ = acceleration at $V_3$ (mph/sec)
$V_3$ = maximum speed for full braking effort (mph)

If the maximum braking power does not occur at $V_3$, then the acceleration and speed for the maximum braking power point must be substituted for $A_3$ and $V_3$. The electrical power that is necessarily handled at the inverter terminals will be less than the rail power by the gear loss, motor mechanical and electrical loss, and inverter loss. A system is typically about 85 percent efficient.

The electrical power for braking can be expressed as:

$$P_E = (E_{DC\,M})2/R_1 + R_2 \quad \text{(watts)}$$

where $E_{DC\,M}$ = Maximum inverter voltage.
The maximum inverter voltage for regenerative braking is $$E_{DC\ M} = R_1 I_{DC} + E_L$$

and the electrical power is $$P_E = I_{DC}^2 R_1 + I_{DC} E_L$$

where $E_{LM}$ = expected DC line voltage during braking, typically 700 VDC $I_{DC}$ = braking current.

Solving these equations simultaneously gives the electrical power for regenerative braking $P_E = E_{DC\ M} (E_{D\ M} -, E_{LM})/R_1$.

The electrical power is approximately $$P_E = (\text{efficiency}) P_R \approx 0.85\ P_R.$$

thus $R_1 = E_{DCM} (E_{DCM} -, E_{LM})/169\ WA_3V_3$ and $R_2 = (E_{DCM}2/169\ WA_3V_3) - R_1$
$= E_{DCM} E_{LM}/169\ WA_3V_3$.

Figure 4:
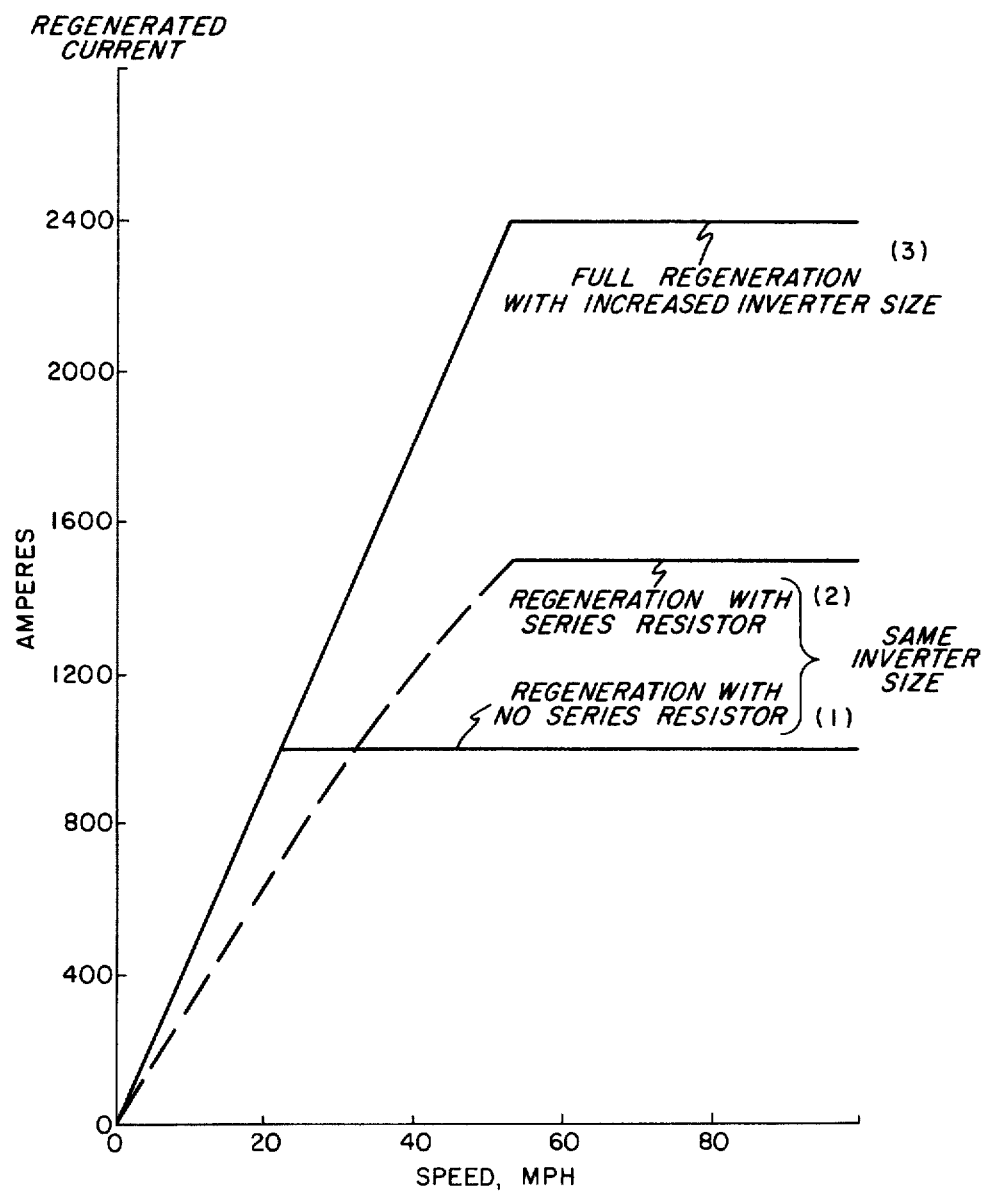
FIG. 4 shows the regenerated line current with and without the extra resistor.

Using these equations, the amount of regenerated current can be calculated for given inverter and motor sizes. FIG. 4 shows the regenerated current for an inverter sized only for the maximum motoring requirement at nominal d-c line both with voltage and without, the series braking resistor, curves 1 and 2 respectively.

The effect of the series resistor is clearly shown in the increased current regenerated above 30 mph. An inverter of 2.4 times the current capacity (and thus size) would be able to regenerate all of the braking power as shown in curve 3.

Figure 5:
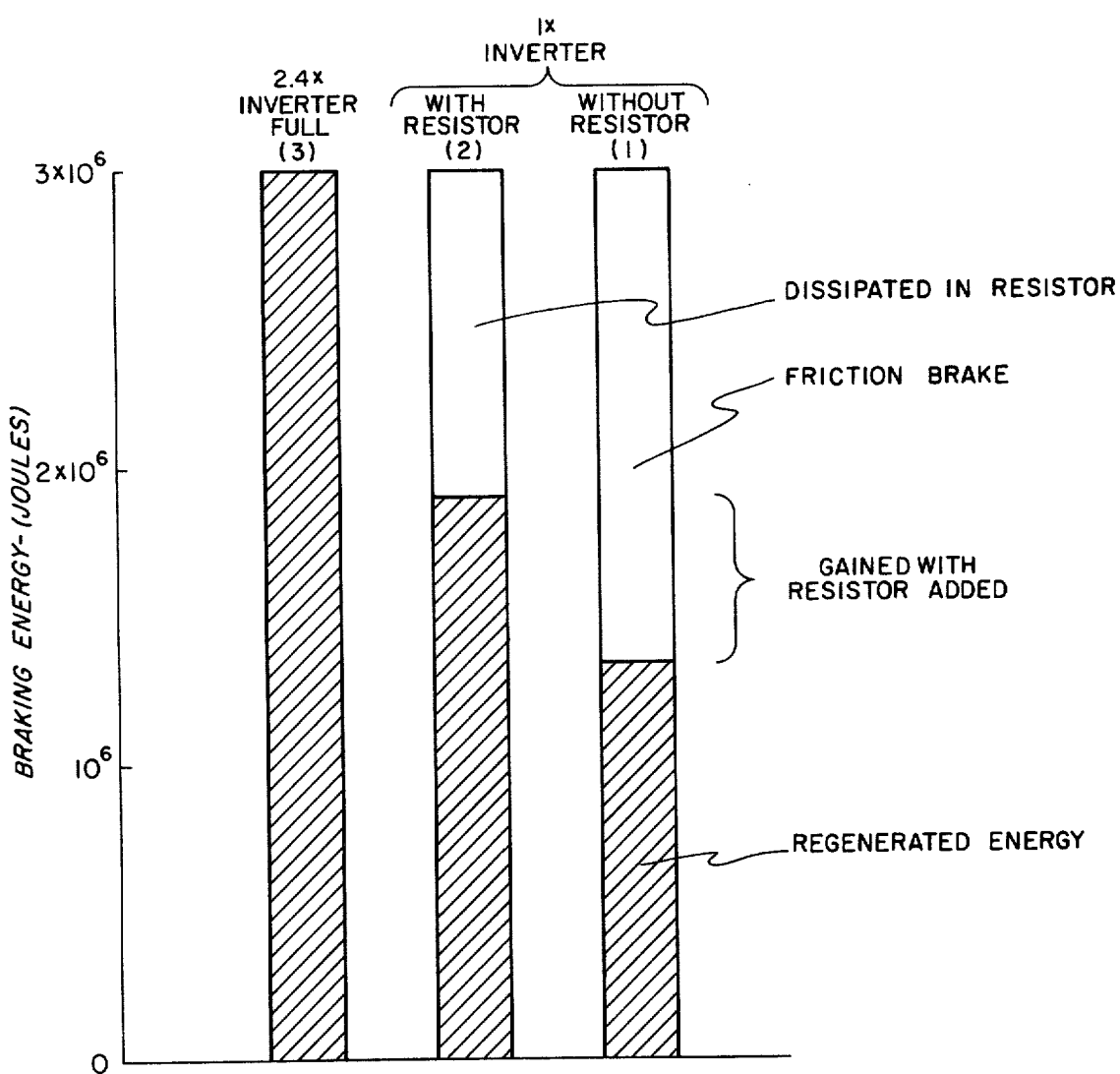
FIG. 5 shows the braking energy with the regenerated fraction indicated.

FIG. 5 shows a comparison of the energy recovery of the various systems. System 3 (2.4 times inverter) can regenerate all of the braking energy. System 2, the one with the added resistor, can regenerate about 65 percent of the braking energy while dissipating about 35 percent in the added resistor. However, all the braking is done electrically. System 1, with no resistor, can regenerate about 42 percent of the braking energy but must dissipate the remainder using the friction brakes.

The net result is that system 2 can supply all electric brake and more regeneration than system 1 by adding the extra resistor and taking advantage of the increase in inverter commutating capacity with the resulting increase in voltage to increase the a-c load current and thus the dc line current.

The method of controlling the motor current in the proper manner to take advantage of the extra resistor is described more fully in U.S. Pat. Application Ser. No. 402,253, entitled "Method and Apparatus for Automatic I.R. Compensation," filed on Oct. 1, 1973 by the present inventor and assigned to the assignee of the present invention, and a patent application entitled "Braking Effort Control," filed concurrently with the present application by the same inventor and having the same assignee as the present application.

What I claim as new and desire to secure by Letters Patent of the United States is:

1. A power conversion circuit for connection across a d-c power source comprising:
   a. power conversion means having input terminals for connection to said d-c power source and output terminals for connection to a load;
   b. commutation means connected to said power conversion means to commutate the current between said input and said output terminals, said commutation means having an increased commutation ability with increased voltage across said input terminals;
   c. a dynamo electric machine for connection across said output terminals, said machine being capable of separately performing motoring and generating functions, so as to receive power from said power conversion means during periods of motoring and deliver power thereto during periods of generation;
   d. means for increasing the voltage across said input terminals above that which exists at said power source during periods of generation, thereby allowing said commutation means to commutate a greater amount of power during generation than during motoring.

2. A power conversion circuit as set forth in claim 1 wherein said voltage increasing means comprises an impedance selectively connectable in series between said power source and said input terminals.

3. A power conversion circuit as set forth in claim 2 wherein said voltage increasing means further includes a diode connected across said impedance to conduct current during periods of motoring.

4. A power conversion circuit as set forth in claim 1 wherein said power conversion means is an inverter for converting d-c current at the input terminals to a-c current at the output terminals and further wherein said dynamo-electric machine comprises an a-c induction motor.

5. A power conversion circuit as set forth in claim 4 wherein said inverter is an impulse commutated inverter.

6. A power conversion circuit as set forth in claim 4 wherein said commutation means includes a capacitor selectively connectable across at least one controlled rectifier of said inverter.

7. A power conversion circuit as set forth in claim 6 wherein said commutation means further includes an inductance serially connected with said capacitor to provide an oscillatory network.

8. A power control circuit for an inverter having input terminals connected to a d-c source and having output terminals connected to an a-c motor comprising:
   a. a d-c power source for delivering d-c power to the input terminals during periods of motoring and receiving d-c power therefrom during periods of generation;
   b. commutation means connected to the inverter to commutate the current between the input and output terminals, said commutation means having an increased commutation ability with increased voltage across said input terminals;
   c. an a-c motor connected to the inverter output terminals for receiving power therefrom during selected periods of motoring and delivering power thereto during selected periods of generation;
   d. means for increasing the voltage across said input terminals, above that of said d-c power source, during periods of generation, thereby increasing the commutation ability of said commutation means during said periods of generation.

9. A power control circuit as set forth in claim 8 wherein said voltage increasing means comprises an impedance selectively connected in series between said power source and said input terminals.

10. A power control circuit as set forth in claim 9 wherein said voltage increasing means further includes a diode across said impedance to conduct current during periods of motoring.

11. A power control circuit as set forth in claim 8 wherein said commutation means includes a capacitor selectively connectable across at least one controlled rectifier of said inverter.

12. A power control circuit as set forth in claim 11 wherein said commutation means further includes an inductance serially connected to said capacitor to provide an oscillatory network.

13. A power conversion circuit for connection across d-c power source comprising:
   a. power conversion means having input terminals for connection across said d-c power source and output terminals for connection to a load;
   b. commutation means connected to said power conversion means to commutate the current between said input and said output terminals, said commutation means having an increased commutation ability with increased voltage across said input terminals;
   c. a dynamo-electric machine for connection aid output terminals, said dynamic machine being capable of separately performing motoring and generating functions so as to respectively receive power from and deliver power to said power conversion means during those periods of operation;
   d. a resistor connectable in series between said d-c power source and said power conversion input terminals to increase the voltage across said input terminals above that across said d-c power source; and
   e. means for effectively switching said resistor into the circuit during periods of generation and switching said resistor out of the circuit during periods of motoring.

14. A power conversion circuit as set forth in claim 13 wherein said switching means comprises a diode connected across said resistor.

15. A power conversion circuit as set forth in claim 14 wherein during periods of generation a portion of the power generated thereby is returned to said d-c power source.

* * * * *